(12) United States Patent
Saari et al.

(10) Patent No.: US 7,143,077 B2
(45) Date of Patent: Nov. 28, 2006

(54) METHOD AND SYSTEM FOR IMPLEMENTING STATISTICAL FUNCTIONS IN A TELEPHONE SWITCHING SYSTEM

(75) Inventors: Jarmo Saari, Jyväskylä (FI); Pasi Majakangas, Jyväskylä (FI)

(73) Assignee: Nokia Corporation, Espoo (FI)

( * ) Notice: Subject to any disclaimer, the term of this patent is extended or adjusted under 35 U.S.C. 154(b) by 511 days.

(21) Appl. No.: 10/044,551

(22) Filed: Jan. 11, 2002

(65) Prior Publication Data

US 2002/0106062 A1    Aug. 8, 2002

Related U.S. Application Data

(63) Continuation of application No. PCT/FI00/00618, filed on Jul. 5, 2000.

(30) Foreign Application Priority Data

Jul. 14, 1999    (FI) ...................... 991608

(51) Int. Cl.
G06F 7/00 (2006.01)
G06F 12/00 (2006.01)
(52) U.S. Cl. ............... 707/1; 707/3; 707/10; 455/432.3
(58) Field of Classification Search .............. 707/1, 707/3, 10, 206, 203, 104.1, 100; 709/222; 714/238; 455/432.3
See application file for complete search history.

(56) References Cited

U.S. PATENT DOCUMENTS

| | | | |
|---|---|---|---|
| 5,418,793 A * | 5/1995 | Chang et al. ............... 714/738 |
| 5,537,611 A | 7/1996 | Rajagopal et al. |
| 5,682,482 A | 10/1997 | Burt et al. |
| 5,802,513 A * | 9/1998 | Bowie, III ..................... 707/3 |
| 5,825,769 A | 10/1998 | O'Reilly et al. |
| 6,175,831 B1 * | 1/2001 | Weinreich et al. ............ 707/10 |
| 6,230,166 B1 * | 5/2001 | Velamuri et al. ........... 707/206 |
| 6,757,723 B1 * | 6/2004 | O'Toole et al. ............. 709/222 |

FOREIGN PATENT DOCUMENTS

| | | |
|---|---|---|
| WO | WO 97/44943 | 11/1997 |
| WO | WO 99/34623 | 7/1999 |
| WO | WO 99/41876 | 8/1999 |
| WO | WO 00/65809 | 11/2000 |

* cited by examiner

Primary Examiner—Sam Rimell
(74) Attorney, Agent, or Firm—Squire, Sanders & Dempsey, LLP

(57) ABSTRACT

The invention concerns a method and a system for real-time addition of statistics definitions and for achieving real-time reporting in a telephone switching system, comprising a database containing information of essential importance to the telephone switching system; a database manager whose function is to maintain the database; and one or more service providers. In the method, a registration of the service provider is received by the database manager; the service provider is asked by means of the database manager to supply information about the services.

22 Claims, 2 Drawing Sheets

Figure 1:
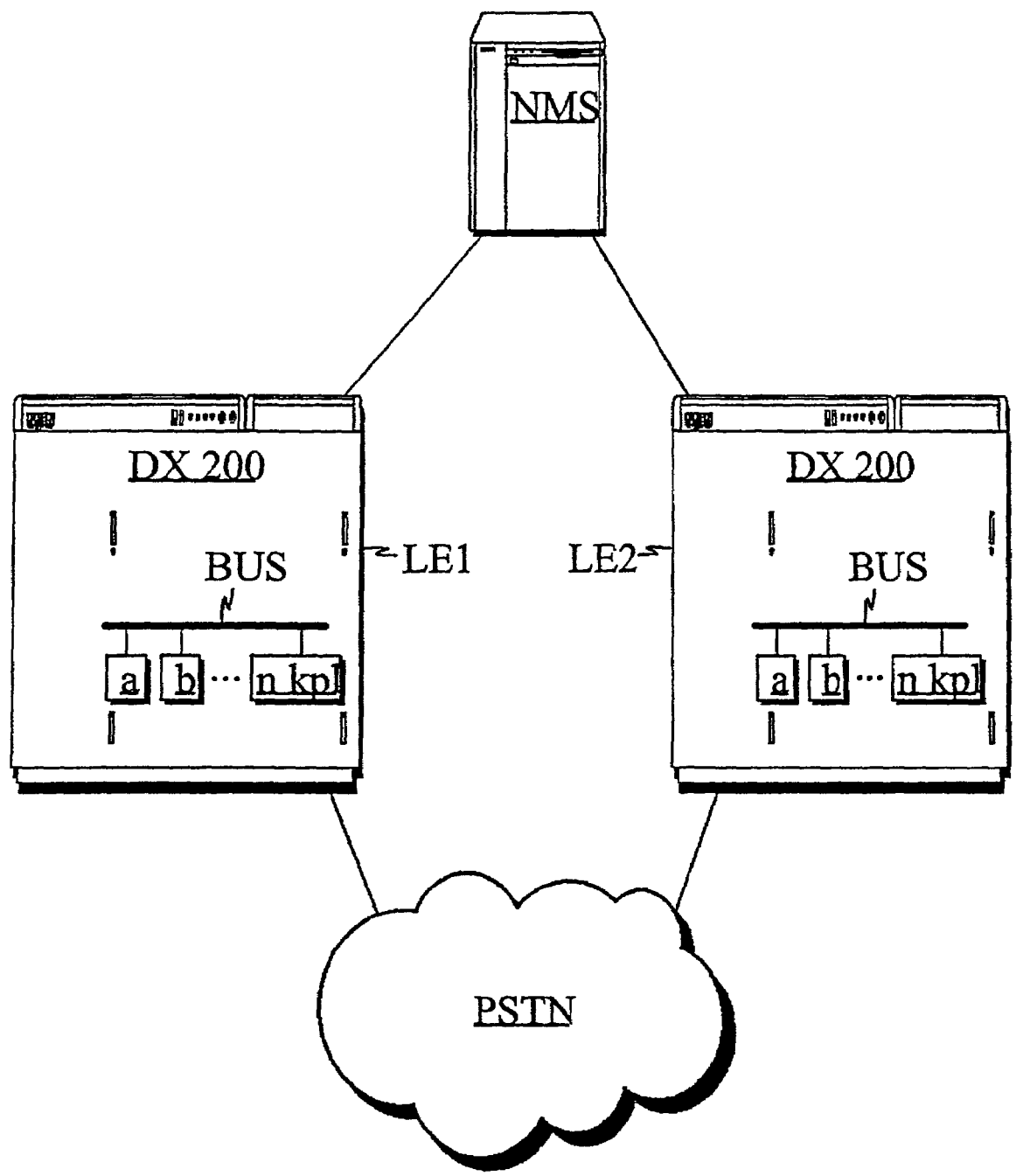

METHOD AND SYSTEM FOR IMPLEMENTING STATISTICAL FUNCTIONS IN A TELEPHONE SWITCHING SYSTEM

This application is a continuation of international application serial number PCT/FI00/00618, filed 5 Jul. 2000.

FIELD OF THE INVENTION

The present invention relates to telecommunication systems. In particular, the invention concerns a method and a system for real-time addition of statistics definitions and for achieving real-time reporting in a telephone switching system.

BACKGROUND OF THE INVENTION

The operation of telephone networks (e.g. PSTN, Public Switched Telephone Network; PLMN, Public Land Mobile Network; ISDN, Integrated Services Digital Network) is based on telephone switching centers used for the transmission of calls. Therefore, it is of primary importance that the telephone switching centers should work properly. Telephone switching centers are complex systems, so maintaining their operational condition is a challenging task. One of the essential functions of a telephone switching center is to monitor its own operation and maintain statistics about it. However, it is to be noted that the various tasks relating to monitoring and statistics should not hamper the normal operation of the telephone switching system.

A large amount of data is continuously being collected about the operation of the telephone switching center. The data is collected e.g. by a network management system (NMS). The operation of the telephone switching system is monitored and managed by the network management system. From the data collected by the network management system, various statistics and reports are generated. Reports are generated e.g. about the calls transmitted by the telephone switching center. One of such reports is the Call Detailed Record (CDR) generated from a call. The call detailed record contains various call-specific data, including e.g. the parties to the call, call duration, etc. Reports are generated on the basis of various specifying functions. In this context, the 'specifying function' refers to a general denominator used to pick up a desired quantity from among the information collected for statistics. In the case of the call detailed record, this specifying function is called a counter. By using a counter, it is easy to pick up the desired quantities from the mass of information collected for statistics.

At present, a problem in the statistical and computing functions is that the information to be reported and the reports themselves are subject to changes. There may arise e.g. a situation where it would be desirable to add a new counter to the call detailed record. Currently the amount of work needed to add a single counter to an existing call detailed record is unreasonable.

Further, at present the network management system cannot be informed in real time as to what information is available from a given network element.

OBJECT OF THE INVENTION

The object of the present invention is to eliminate the drawbacks referred to above or at least to significantly alleviate them. A specific object of the invention is to disclose a new type of method and system for the addition of statistics definitions in real time and for the achievement of real-time reporting. One of the objects of the invention is to facilitate the addition of new counters to a telephone switching system.

When a network element is to be expanded by adding e.g. new computer units, the invention makes it possible to obtain real-time data about the information provided by the new computer units.

As for the features characteristic of the present invention, reference is made to the claims.

BRIEF DESCRIPTION OF THE INVENTION

The method of the invention concerns the addition of statistics definitions in real time and the achievement of real-time reporting in a telephone switching system. The system of the invention comprises a database which contains information of essential importance to the telephone switching system, and a database manager whose function is to maintain the database. The database manager is e.g. a program block or process implemented using a computer. In addition, the system of the invention comprises one or more service providers whose function is to produce information about the operation of the telephone switching system.

According to the invention, a registration of a service provider is received by the database manager. When a network element comprised in the telephone switching system is started up, the service provider remains waiting until the database manager gives it a permission to start up. At start-up, the service providers send an inquiry e.g. to a name service to learn the location of the database manager. Thus, the location of the database manager may be unknown to the service providers at start-up. When the network element is started up, the database manager reports to the name service. 'Name service' refers to a service implemented using a computer which registers the locations of service providers belonging to the same network element and of different computer units.

The database manager asks the service provider to give detailed information about the new service. The database manager saves the definition data supplied by the service provider into the database. The information produced by each service provider is associated with individual identification data. The service provider may also give the database manager a reference to a file that contains details about the content of the service produced by the service provider. On the basis of the definition data given by the service provider and/or of existing data, it is possible to generate a new definitions file.

In an embodiment of the invention, the version number of the service produced by the service provider is first checked. If the version number of the service is so far unknown, then the service provider is asked to give detailed information about the services produced by it. If the version number of the service is already known, then it is possible to send service requests to the service provider and no separate update is needed.

In an embodiment of the invention, a service request is sent to the service provider. At the same time, the version of the service provided by the service provider is checked on the basis of acknowledgement data received from the service provider and of the version number received with it. If the version number is so far unknown, then the service request is cancelled.

The database of the invention contains all possible counter data and other necessary data needed for the generation of reports. For each counter and each piece of information, the database contains a number of definition data items. There may be two kinds of definition data: fixed definition data and network-element specific definition data. Fixed definition data means e.g. names obtained from various standards. The counters and different pieces of information are associated with certain fixed data, which have to be input into the database beforehand. Below are a few examples of fixed definition data.

Id_nro. An unambiguous identification number for each counter. No other counter or piece of information can have the same identification number.

Name. The name is a generally used designation of the counter. Names are found e.g. in standards.

Type. Indicates the type of the counter or data in question.

Report_type. Indicates the type of the report that the counter belongs to. The report is e.g. a traffic measurement or load monitoring report.

The network-element specific definition data include e.g. data needed by measurement software in order to be able to locate the counter or information in the network element and to add it to the report. The database manager receives these definition data from the service providers. Presented below are a few network-element specific definitions.

Exist. Indicates whether the counter or piece of information in question exists in the network element concerned or not.

Shown. If the counter or piece of information exists in the network element, this indicates whether it is to be shown on reports delivered to the client.

Service. Name of the service providing the counter or service in question.

Unit_nro. The number of the computer unit in which the provider of the counter or information is located.

Process_id. Identification of the process providing the service.

Once the definition data supplied by the service provider have been updated in the database, those and other necessary data can be used as a basis for the generation of new definitions files. The database manager generates a definitions file automatically when necessary. 'Definitions file' refers to a file which specifies what data is collected from which unit. It also specifies the form of the report. The measurement programs generate reports on the basis of a definitions file produced by the database manager. It is possible to produce different reports for different parties. The amount and accuracy of data reported to a given party may be greater than of data reported to another party. Further, it is possible to delete an existing definitions file or change it as desirable.

There may be one or more databases. Different types of data can be stored in separate databases.

The system of the invention comprises means for receiving the registration of a service provider by the database manager and means for sending by means of the database manager an inquiry regarding the services produced by the service provider. In addition, the system comprises means for storing the definition data given by the service provider in the database and means for generating a new definitions file on the basis of the definition data given by the service provider and/or of existing information.

In a preferred embodiment of the present invention, the system comprises means for checking the version number of the service provided by the service provider, means for asking detailed information about the services produced by the service provider, and means for requesting a service from the service provider.

In a preferred embodiment of the present invention, the system comprises means for requesting a service from the service provider, means for checking the version number of the service produced by the service provider and means for canceling the service request.

In a preferred embodiment of the present invention, system comprises means for reporting the database manager to a name service. The system further comprises means for establishing the address data of the database manager via an inquiry to the name service.

In a preferred embodiment of the present invention, system comprises means for attaching individual identification data to the information produced by the service provider. The system further comprises means for dividing the definition data into fixed definition data and network-element specific data.

In a preferred embodiment of the present invention, system comprises means for giving a reference to a file to the database manager, said file containing information about the content of the service produced by the service provider, and means for storing the data collected by the database manager in several databases on the basis of data types.

In a preferred embodiment of the present invention, the system comprises means for generating definitions files on the basis of the data contained in the database, and means for generating a report on the basis of a definitions file generated by the database manager.

In a preferred embodiment of the present invention, system comprises means for deleting or changing a previously defined definitions file.

The present invention makes it possible to add new features or counters to the statistical functions and reporting. An existing implementation need not be changed when new counters are to be added to the reports or when existing ones are to be deleted. Moreover, the invention makes it possible to transfer the same program code produced for measurement functions from one network element to another. When a network element is expanded e.g. by adding new computer units, the invention allows real-time data to be obtained about the information provided by the new computer units. All the available network-element specific information is provided in the database of the invention. That is where e.g. the network management system can get the information it wants.

Furthermore, the invention eliminates hard-coded reports and allows very dynamic reports to be generated.

LIST OF ILLUSTRATIONS

Figure 2:
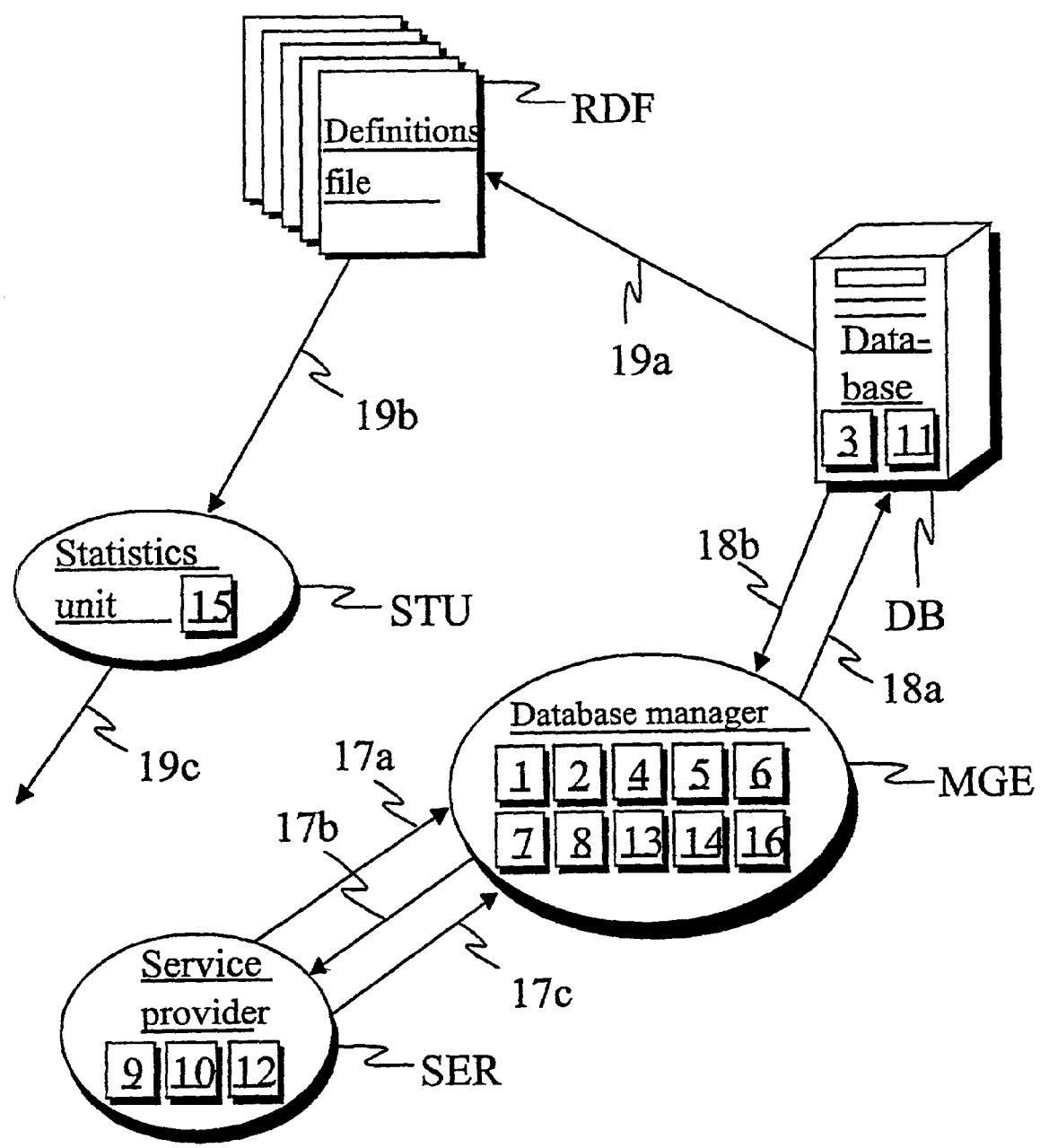

In the following, the invention will be described in detail by the aid of a few examples of its embodiments, wherein FIG. 1 presents a preferred system according to the invention, and FIG. 2 presents a preferred example of the operation of the invention.

DETAILED DESCRIPTION OF THE INVENTION

FIG. 1 presents a preferred system according to the present invention. The system presented in FIG. 1 comprises a telephone network PSTN and network elements LE1 and LE2. Connected to both network elements is a network management system NMS. Moreover, both network elements are connected to the telephone network PSTN. The network element is preferably a telephone switching center, e.g. a DX200 manufactured by the applicant. It is to be noted that the system in FIG. 2 is only presented by way of example and may be a part of a larger system.

The telephone switching centers LE1 and LE2 comprise a bus BUS with several different computer units connected to it. Such units are e.g. computer units a and b. There is no predefined limit to the total number of computer units. In this example, the telephone switching center contains n computer units.

The network management system NMS is connected to the telephone switching centers LE1 and LE2 e.g. via an X.25 packet service. Via the network management system, it is possible e.g. to produce information about the operation of the switching center, analyze the traffic and perform various management operations.

FIG. 2 presents a preferred example of the operation of the invention. FIG. 2 comprises a service provider SER, a database manager MGER, a database DB, report definitions files RDF and a statistics unit STU, all of which may be located e.g. in the telephone switching center. The service provider communicates with the database manager. Although the figure only shows one service provider, the operation is not limited to a single service provider; instead, the system may comprise several service providers. The database manager is responsible for the updating of the database with the information received from the service provider. The database manager is equipped with means for generating definitions files on the basis of the contents of the database. From the information in these definitions files, the statistics unit can generate the required reports. 'Statistics unit' may refer to any computer unit in the network element.

Using program block or process 9, the address data of the database manager MGER is established via an inquiry to a name service. Via program block or process 10, individual identification data is attached to the information produced by the service provider SER, and notification means 12 are used to give the database manager a reference to a file that contains information about the content of the services produced by the service provider.

The database manager MGER comprises reception means 1 for receiving the registration of the service provider SER and data acquisition means 2 for asking for information regarding the services produced by the service provider. Using program block or process 4, a new report definitions file RDF is generated on the basis of information supplied by the service provider or providers and/or existing information. Using checking means 5, the version number of the service produced by the service provider is checked, and functional means 6 are used to send a service request to the service provider. Using means 7, a service request already sent can be canceled.

Using program block or process 8, the database manager MGER is reported to the name service, storage means 13 are used to store the information collected from the service providers SER in several databases on the basis of data types, and generating means 14 are used to generate report definitions files RDF based on the information contained in the database DB. Processing means 16 are used to delete or change a previously defined definitions file.

The database DB comprises storage means 3, which are used to store the definition data supplied by the service provider SER in the database and sorting means 11 for dividing the definition data into fixed definition data and network-element specific data. The statistics unit STU comprises means 15 for generating a report. The report is generated on the basis of a report definitions file RDF produced by the database manager MGER.

At the start-up of the network element, the database manager MGER reports to the name service. 'Name service' means a service, implemented e.g. using a computer, which registers the locations of service providers and different computer units belonging to the same network element. The database manager has to be thus registered with the name service to make it possible for processes needing the services of the database manager to establish its location. Further, as the network element is started up, the service provider SER remains waiting until the database manager gives it a permission to start up. The operation is not limited to a single service provider; instead, several of them may be included in the system.

When started up, the service providers SER report to the name service and ask it for the location data of the database manager MGER. Based on the location data, the service providers locate the database manager and report to it, arrow 17a. Thus, the location of the database manager may be unknown to the service providers at start-up time. The database manager collects information about the service providers and starts a round of inquiries. Taking a service at a time, the database manager inquires what counters/information are/is provided in the service, arrows 17b and 17c. Such data include e.g. identification number, name, type and report type data. The identification number is counter-specific, so no other counter or information can have the same identification number. The name is the designation generally used to refer to the counter in question. The type indicates what type of counter or information is provided. The report type data indicates the type of report the counter belongs to. Report types include e.g. traffic measurement and load monitoring.

Having collected all the necessary information about the service providers SER and the services provided by them, the database manager MGER updates the database DB with the information it has collected, arrow 18a. The database manager MGER reads the definition data in the database as indicated by arrow 18b and generates the actual report definitions files RDF, arrow 19a. A measuring unit, which in this example is a statistics unit STU, uses the report definitions files RDF to generate the required reports, arrow 19b. The operator can define e.g. the reporting frequency and the numbers of samples. The statistics unit STU generates the report on the basis of the definitions file as indicated by arrow 19c. It is to be noted that when referring to a statistics unit STU, this is only a preferred example of a computer applicable for the purpose.

Means 1–16 are implemented e.g. as software blocks using a computer.

In an embodiment as illustrated in FIG. 2, when a service requester needs a service, it can first check the version number of the service provided, if desirable. If the version number of the service is previously known, then the service requester can set a service request to the service provider. If the version number is unknown, then the service requester will ask the service provider to supply information about the service in question. The service requester is e.g. a database manager as shown in FIG. 2.

In another embodiment according to FIG. 2, the service requester requests a service from the service provider directly without first checking the version number. In a response message, the service provider sends the version number of the service. If the version number received is unknown to the service requester, then the latter will cancel the service. The service requester is e.g. a database manager as shown in FIG. 2.

The invention is not restricted to the examples of its embodiments described above; instead, many variations are possible within the scope of the inventive idea defined in the claims.

The invention claimed is:

1. Method for real-time addition of statistics definitions and for achieving real-time reporting in a telephone switching system, comprising:
   a database containing information of essential importance to the telephone switching system;
   a database manager, whose function is to maintain the database;
   one or more service providers;
   wherein the method comprises the steps of:
   receiving by means of the database manager a registration of the service provider;
   having the database manager send the service provider an inquiry asking for information about services produced by it;
   storing service definition data supplied by the service provider in the database;
   generating a new definitions file for reporting purposes on the basis of the service definition data in the database;
   checking a version number of one of said services produced by the service provider; and
   asking the service provider to supply service definition data about the services produced by it if the version number of the service provided is not within said service definition data; or
   giving the service provider a request for the service if the version number of the service provided is within said service definition data.

2. Method as defined in claim 1, wherein
   a version number of the service provided by the service provider is checked when a request for the service is given to the service provider; and
   the service request is canceled if the service version number returned by the service provider is previously unknown.

3. Method as defined in claim 1, wherein address data of the database manager is reported to a name service.

4. Method as defined in claim 1, wherein address data of the database manager is established via an inquiry to a name service.

5. Method as defined in claim 1, wherein individual identification data is attached to each piece of information produced by the service provider.

6. Method as defined in claim 1, wherein the service definition data are divided into fixed specification data and network-element specific data.

7. Method as defined in claim 1, wherein the database manager is given a reference to a file that contains information about content of the service produced by the service provider.

8. Method as defined in claim 1, wherein the service definition data collected by the database manager are stored in several different databases based on data types.

9. Method as defined in claim 1, wherein definitions files are generated on the basis of the service definition data contained in the database.

10. Method as defined in claim 1, wherein reports are generated on the basis of a definitions file produced by the database manager.

11. Method as defined in claim 1, wherein a definitions file previously defined is deleted or changed.

12. System for real-time addition of statistics definitions and for achieving real-time reporting in a telephone switching system, comprising:
    a database containing information of essential importance to the telephone switching system;
    a database manager, whose function is to maintain the database;
    one or more service providers;
    wherein the system comprises:
    means for receiving a registration of a service provider by means of the database manager;
    means for requesting information about services produced by the service provider, using the database manager;
    means for storing service definition data supplied by the service provider in the database;
    means for generating a new definitions file for reporting purposes on the basis of the service definition data in the database;
    means for checking a version number of one of said services produced by the service provider;
    means for asking the service provider to supply service definition data about the services produced by it if the version number of the service provided is not within said service definition data; and
    means for giving the service provider a request for the service if the version number of the service provided is within said service definition data.

13. System as defined in claim 12, wherein the system comprises:
    means for checking a version number of the service produced by the service provider; and
    means for canceling a service request.

14. System as defined in claim 12, wherein the system comprises means for reporting the database manager to a name service.

15. System as defined in claim 12, wherein the system comprises means for establishing address data of the database manager via an inquiry to a name service.

16. System as defined in claim 12, wherein the system comprises means for attaching individual identification data to information produced by the service provider.

17. System as defined in claim 12, wherein the system comprises means for dividing the definition data into fixed definitions and network-element specific data.

18. System as defined in claim 12, wherein the system comprises means for giving the database manager a reference to a file that contains information about content of the service produced by the service provider.

19. System as defined in claim 12, wherein the system comprises means for storing the service definition data collected by the database manager in several different databases on the basis of data types.

20. System as defined in claim 12, wherein the system comprises means for generating definitions files on the basis of the service definition data contained in the database.

21. System as defined in claim 12, wherein the system comprises means for generating a report on the basis of a definitions file produced by the database manager.

22. System as defined in claim 12, wherein the system comprises means for deleting or changing a definitions file previously defined.

* * * * *